United States Patent [19]

Smith

[11] Patent Number: 4,727,612

[45] Date of Patent: Mar. 1, 1988

[54] TAIL BRIDGE

[76] Inventor: Edward R. Smith, 53 Belcher Rd., Blairstown, N.J. 07825

[21] Appl. No.: 9,916

[22] Filed: Feb. 2, 1987

[51] Int. Cl.⁴ .............................................. E01D 1/00
[52] U.S. Cl. ...................................................... 14/69.5
[58] Field of Search ......................... 14/69.5; 16/5, 8; 24/67 R, 457

[56] References Cited

U.S. PATENT DOCUMENTS

| | | | |
|---|---|---|---|
| 1,568,303 | 1/1926 | Webster | 14/69.5 |
| 2,594,425 | 4/1952 | Greenberg | 14/69.5 X |
| 3,984,891 | 10/1976 | Weinmann | 14/69.5 |
| 4,528,711 | 7/1985 | Packer | 14/69.5 |

Primary Examiner—James A. Leppink
Assistant Examiner—Matthew Smith
Attorney, Agent, or Firm—Horst M. Kasper

[57] ABSTRACT

The invention provides a tail bridge for bridging a tail end of a motor vehicle and a ramp rail. A first plate to be placed on the motor vehicle tail end is joined along a straight line at one edge to a second plate making an angle of from 12 to 20 degrees with the first plate. An intermediate plate is attached at the joint of the first and second plates and runs downwardly. A third plate is attached to the lower end of the intermediate plate and runs about parallel to the second plate at a distance corresponding to the thickness of a rail to be placed between the second and third plates. Bolt holes can be provided in the first and second plates for secure attachment to the motor vehicle tail end and the ramp rail.

17 Claims, 3 Drawing Figures

TAIL BRIDGE

BACKGROUND OF THE INVENTION

1. Field of the Invention

The present invention relates to a tail bridge that provides a bridge between the tail part of a motor vehicle and a support rail.

2. Brief Description of the Background of the Invention Including Prior Art

U.S. Pat. No. 2,594,425 to Hymen Greenberg teaches a removable runway. The shape of a plate is taught, where sides are cut and bent to provide gripping fingers 52 similar to gripping fingers 24 and 26. This construction is intended to be a carpet edge so that it is possible to move for example beds or fold rollers over items.

U.S. Pat. No. 1,568,303 to W. E. Webster teaches a freight skid. The freight skid is formed by a plank having the upper face of its ends beveled and adapted to receive another plate, which preferably has a full width of the skid section. A overhung bend or bight in the plate is cut away to form hinge elements adapted to receive a hinge pin. This is quite a complicated construction for providing a freight skid.

U.S. Pat. No. 3,580,373 teaches a portable ramp. The portable ramp includes a transverse member that is detachably secured to the floor member at one end thereof and to a vehicle. A downwardly projecting portion of detent projects through a mating opening in a shoulder portion of a transverse member.

U.S. Pat. No. 749,595 to H. Van Doorn teaches a wharf drop. According to FIG. 5a of the reference, only a single worm shaft is employed, which extends from side to side of the wharf drop and is provided with a right and left hand worm engaging the worm wheels 35 ff, respectively.

All these references teach relatively complicated devices. Some of them relate to fields completely different from a tail bridge, such as, for example, carpet edges.

SUMMARY OF THE INVENTION

1. Purposes of the Invention

It is an object of the present invention to provide a simple device that allows the movement of material from ground level to the loading level of a motor vehicle.

It is another object of the present invention to provide a device that avoids a step during a loading and unloading process from a motor vehicle for items to be moved along a surface.

It is yet another object of the present invention to provide a structurally sound and stable means for performing loading and unloading operations from motor vehicles.

These and other objects and advantages of the present invention will become evident from the description which follows.

2. Brief Description of the Invention

The present invention provides a tail bridge for bridging a tail end of a motor vehicle and a ramp rail. The tail bridge comprises four plates. A first plate for placing on the tail end of the motor vehicle and for running about parallel to the tail edge of the motor vehicle tail end is joined along a straight junction line to a second plate extending at an edge of the first plate and forming an angle of from about 12 to 20 degrees relative to the first plate. An intermediate section is attached between the first and second plate along the straight junction line and runs downwardly. A third plate is attached to the lower end of the intermediate section and runs substantially parallel to the second plate at a distance corresponding to the thickness of a rail to be placed between the second and third plate.

The intermediate section can be disposed at an angle from about 85 to 95 degrees relative to the first plate.

The upper edge of the open end of the first plate and the upper edge of the free end of the second plate can be beveled. A bevel can be disposed at the lower end of the open end of the third plate, where the bevel can extend over nearly the full width of the third plate and the bevel angle can be about 30 degrees.

The thickness of the first plate can be reduced by from about 40 to 60 percent between the area near the junction between the second plate and the free end. The third plate can be reduced in thickness from by about 20 to 30 percent when moving from an end near the intermediate section to the free end of the third plate.

Traction lines can be provided on top of the first plate and of the second plate and can run substantially in parallel to the junction between the first and second plate.

Holes having a diameter of from about $\frac{1}{4}$ of an inch to about $\frac{1}{2}$ of an inch can be provided near the two free corners of the first plate. Holes having a diameter of from about $\frac{1}{4}$ inch to 1 inch can be disposed on the second plate and on the third plate and can be aligned in a vertical direction toward the second and third plate extension.

The tail bridge can be comprised throughout of an extruded metal, which preferably is an aluminum alloy.

The first plate can have an extension of from about 4 to 6 inches and where the second plate and the third plate can have an extension of from about 3 to 5 inches. The width of the plates can be from about 5 to 15 inches. The first plate can have a thickness of from about 0.15 inches to 0.5 inches, the second plate can have a thickness of from about 0.2 to 0.4 inches, the third plate can have a thickness of from about 0.15 to 0.3 inches and the intermediate section can have a thickness of from about 0.2 to 0.4 inches. Fillets with a radius of from about 0.5 to 1.5 times the thickness of the intermediate section can be provided between the first plate, the second plate and the intermediate plate.

The yield strength of the tail bridge for 0.2 percent offset preferably is at least 10,000 pounds per square inch, the tensile strength of the alloy employed is preferably at least 20,000 pounds per square inch, and the Brinell hardness of the alloy preferably is at least 40. The rated stability of the device preferably is at least 300 pounds maximum for each device.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

Figure 1:
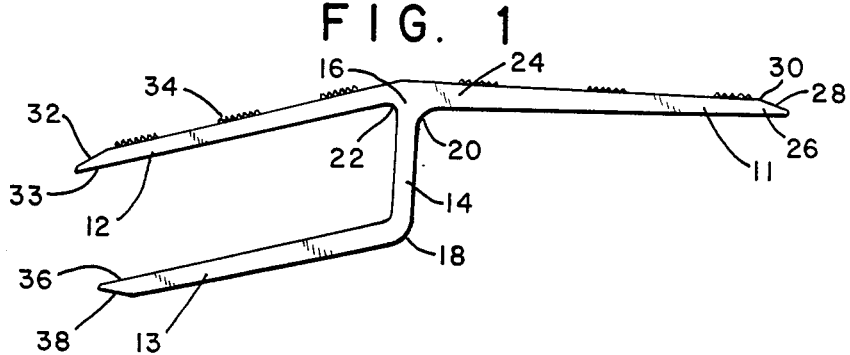
FIG. 1 is a sectional view of the tail bridge.
Figure 2:
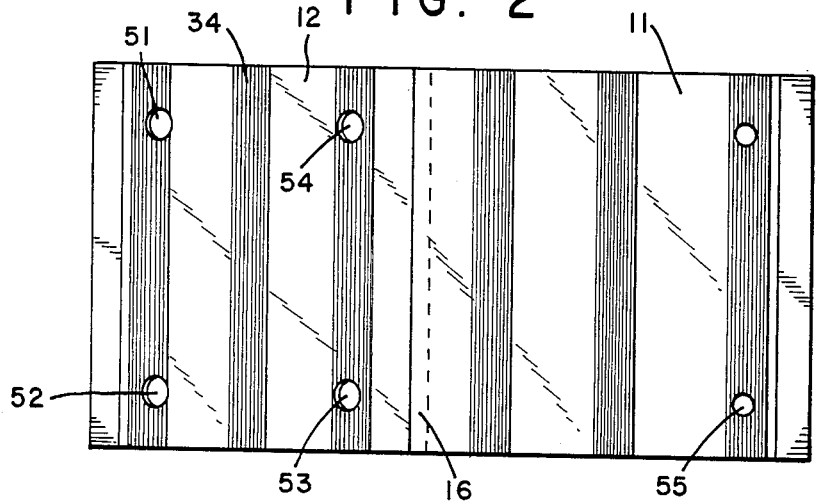
FIG. 2 is a top view of the tail bridge.

In accordance with the present invention, there is provided a tail bridge comprising four plates, where the first plate 11 is to be disposed on and supported by a tail section of a motor vehicle. A second plate 12 joins the first plate at its end along a straight line 16. An intermediate plate 14 is attached to the joint of the first and second plate in a downward direction. A third plate 13 is attached to the end 18 of the intermediate plate 14. The first plate, the second plate and the intermediate plate form a strong joint at 16. The strength of the joint 16 is increased by fillets 20, 22 disposed between the first plate and the intermediate plate and between the second plate and the intermediate plate. These fillets 20, 22 can have a fillet radius of from about 0.5 to 2 times the thickness of the intermediate plate 14.

The first plate 11 is conceptually positioned in a horizontal direction. Preferably, the width of the first plate 11 is larger at the end 24 where it joins the second plate 12 as compared to its free end 26. The amount of thickness reduction between the end 24 adjoining the junction to the second plate 12 and the free end 26 can be from about 30 to 60 percent. The end section is preferably provided with a bevel 28.

The length of the first plate 11 can be from about 3 to 8 inches and preferably is between 4 and 6 inches, such as for example, about 5 inches. The free end 26 of the first plate 11 is preferably provided with a bevel 28. The bevel 28 is provided at the upper end corner 30 and preferably can cover nearly the full thickness width of the end part of the first plate. The bevel angle can be from about 20 to 45 degrees and is preferably about 25 to 35 degrees as measured relative to a plane parallel to the first plate. Furthermore, the edge at the end of the first plate 11, as well as the corresponding edges of the second and third plate to be mentioned later, are preferably provided such that these are not sharp edges but have a radius of curvature of at least $\frac{1}{8}$ inch.

The second plate 12 is disposed versus the first plate 11 at an angle of from about 12 to 20 degrees and preferably at an angle of from about 14 to 16 degrees, such as, for example, an angle of 15 degrees. The second plate 12 is generally shorter than the first plate 11 and is preferably from about 10 to 30 percent shorter than the first plate 11. The thickness of the second plate 12 is preferably substantially uniform, that is, uniform with variations of up to 10 percent between one end and the other. The second plate 12 is again preferably provided with a bevel 32 on its upper edge 33, which can be at an angle of from 20 to 45 degrees and preferably from about 25 to 35 degrees relative to a plane parallel to the plate.

The tops of the first plate 11 and of the second plate 12 are preferably provided with friction generating elements 34, such as linear protrusions running parallel to the junction of the first and second plate, which allows, for example, tires to better grip to the tail bridge. Preferably, the surface of the first and second section is each subdivided such that each such section comprises from about 2 to 5 gripping sections with flat sections in between, where the gripping sections have a width of from about 0.8 to 1.2 times the width of the flat sections. The protrusions are preferably less than from about 1 to 10 percent of the thickness of the plates. The general shape of the cross section of the protrusions can be from about square to semicircular.

The intermediate plate 14 generally extends in an angular direction that is between a perpendicular plane relative to the first plate 11 and a perpendicular plane relative to the second plate 12. More preferably, the intermediate plate 14 is in the above range within that half of the angle range that is adjacent to a perpendicular plane standing vertical to the first plate. The length of the intermediate plate 14 is such that a distance sufficient to support and hold a ramp rail is generated between the second plate 12 and the third plate 13.

The length of the third plate 13 can be from about 0.8 to 1.2 times the length of the second plate 12 and is preferably from 0.9 to 1 times the length of the second plate. The free end 36 of the third plate is preferably provided with a bevel 38, where the bevel surface forms an angle of from 20 to 45 degrees with the plane of the third plate.

It is important that the second and third plate are constructed such that a good fit is provided to the ramp rail surfaces. Upon load, the ramp rail is preferably supported on the ground at its one end. Such fixture then results in a compression between the rail and the tail bridge against the area of the intermediate plate under load.

Figure 3:
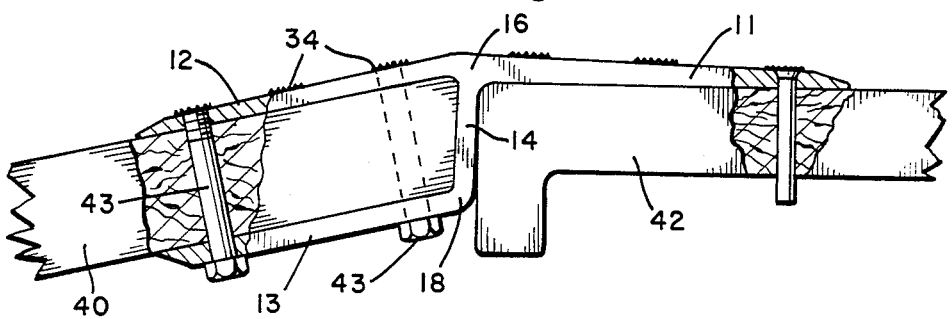
FIG. 3 is a sectional view of the tail bridge assembled to a wooden rail and positioned on a tailgate of a motor vehicle.

In addition, preferably the support rail 40 is bolted to the second and third plates, as is illustrated in FIG. 3. On the right-hand side of FIG. 3 a temporary means 51 for securing the ramp bridge to the tail end of a motor vehicle. Such temporary means may be constructed in such way as to make use of such temporary means optional and to avoid a need of employing such temporary means each time the ramp bridges are used. It is necessary that the surfaces of the rail are essentially flush against the surfaces of the second and third plates so as to achieve a strong connection between tail bridge and rail. Furthermore, bolt holes 51–54 are to be provided in the second 12 and third plate 13 which are aligned perpendicularly to the extension of these plates such that bolts 43 can be employed and tightened to hold a rail in place between the second and third plate. The bore holes can have diameters from about $\frac{1}{4}$ inch to about 1 inch and preferably have diameters of $\frac{3}{8}$ to $\frac{5}{8}$ inch. In general, these bore holes are shown in the drawing designated as 51, 52, 53 and 54. The second rail can have a thickness of from about 0.15 inch to 0.3 inch and the thickness is preferably about 0.25 inch.

The intermediate plate 14 can have a thickness of from about 0.15 to 0.4 inches and is preferably between 0.2 and 0.3 inches such as near 0.25 inches. The third plate 13 adjoins the intermediate plate 14 and has a length of from about 0.7 to 1 times the length of the first plate 11. Preferably the end 18 of the third plate 13 and the end 16 of the second plate are vertically aligned relative the second 12 and third plate 13 surfaces. The third plate is provided with a bevel at its lower end that can be disposed at an angle of from about 20 to 45 degrees and preferably at an angle of from about 25 to 35 degrees relative to the third plate plane. The width of the bevel can be about 1/5 to 1/10 of the length of the third plate and is preferably from about 0.4 to 0.6 inches.

Furthermore, the first plate 11 is preferably provided with holes 55 that can have a diameter of from $\frac{1}{4}$ to $\frac{1}{2}$ inch and that can provide an attachment means for attaching and securing the first plate 11 on the tail end 42 of a load platform of a motor vehicle.

The device of the present invention is preferably produced as an integral piece by metal extrusion. Preferred metals employed include alloys of aluminum such as alloy 6061-T6. Other materials useful for producing the invention device include formed metals such as formed steel. The steel employed can be in the form of a T beam, where one upper arm of the T is bent off at an angle of from about 12 to 18 degrees and where the lower part of the T is bent off and formed to provide the intermediate plate and the third plate. Alternatively, the tail bridge could be welded together by employing various welding processes for T joints or corner joints. Useable weld types included bead, groove, fillet and weave.

The overall dimensions of the device are preferably less than 30 inches and more preferably less than about 10 inches, and these dimensions can be those dimensions running in the directions of a three dimensional coordinate system. The width of the device can be from about 5 to 20 inches and preferably is between 6 and 10 inches, such as, for example, about 8 inches. This width is appropriate for matching dimensional lumber pieces such as material stock of nominal 2×10. The distance between the second plate and the third plate also is set such that it closely matches the thickness dimensions of dimensional lumber pieces. For example, a thickness of 1.5 inches is appropriate for nominal 2 inch lumber material.

The present invention provides the advantage that the tail bridge is suitable for moving heavy equipment with ease onto a loading platfrom of a motor vehicle. In view of the compression forces resulting upon loading a ramp and the tail bridge, substantial stability is provided and rated weights of 300 pounds and can be obtained. The tail bridge provides a relatively smooth but nevertheless friction providing support for wheels that have to be transported onto a loading level of a motor vehicle or of a trailer. The bolt attachment that can be provided on both the vehicular end side and on the side with ramp rail ensures a secure support for the materials to be moved onto the loading level.

The invention device has further applications in providing a scaffolding support for masons such that a staging on an upper level can be achieved and wheel barrows can be moved upward from level to level. In particular, bumps are avoided and a secure attachment is present.

A further application of the tail bridge can be for temporary installation of ramps for wheel chairs, which ramps can be disposed on top of stairways. The first plate can be easily installed at the top of a stairway, and the two ramp rails would still allow intermediate space for a person to mount the stairs as they originally existed while at the same time allowing a wheel chair to be moved upward. Of course, the relative angles between the first plate 11 and the second plate 12 would be adjusted to the rise angle of the stairway, such as, for example, from about 35 to 50 degrees. Also the dimensions of the plates could be adapted to the specific stair parameters.

It will be understood that each of the elements described above, or two or more together, may also find a useful application in other types of support system configurations differing from the types described above.

While the invention has been illustrated and described as embodied in the context of a tail bridge, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tail bridge for bridging a tail end of a motor vehicle and a ramp rail comprising:
   a first plate to be placed on the tail end of the motor vehicle for running substantially parallel to the tail edge of the motor vehicle tail end;
   a second plate rigidly joined to the first plate along a straight uninterrupted junction line and extending at an edge of the first plate and forming an angle of from about 12 to 20 degrees relative to the first plate;
   an intermediate section attached between the first and second plate substantially along the straight junction line and extending downwardly;
   a third plate attached to the lower end of the intermediate section and running substantially parallel to the second plate and spaced therefrom by a distance corresponding to the width of a rail to be placed between the second and third plate.

2. The tail edge for bridging a tail end of a motor vehicle and a ramp rail according to claim 1 wherein the intermediate section is disposed at an angle from about 85 to 95 degrees relative to the first plate.

3. The tail bridge for bridging a tail end of a motor vehicle and a ramp rail according to claim 1 further comprising:
   a bevel at the upper edge of the open end of the first plate.

4. The tail bridge for bridging a tail end of a motor vehicle and a ramp rail according to claim 1 further comprising:
   a bevel disposed at the upper edge of the free end of the second plate.

5. The tail bridge for bridging a tail end of a motor vehicle and a ramp rail according to claim 1 further comprising:
   a bevel disposed at the lower end of the open end of the third plate, where the bevel extends over nearly the full width of the third plate and where the bevel angle is about 20 to 40 degrees.

6. The tail bridge for bridging a tail end of a motor vehicle and a ramp rail according to claim 1 wherein the thickess of the first plate is tapered and being reduced by from about 40 to 60 percent between the area near the junction of the first plate and of the second plate and the free end.

7. The tail bridge for bridging a tail end of a motor vehicle and a ramp rail according to claim 1 wherein the third plate is tapered and being reduced in thickness from by about 20 to 30 percent when moving from an end near the intermediate section to the free end of the third plate.

8. The tail bridge for bridging a tail end of a motor vehicle and a ramp rail according to claim 1 further comprising:

traction lines on top of the first plate and on top of the second plate, which traction lines run substantially in parallel to the junction between the first and second plate.

9. The tail bridge for bridging a tail end of a motor vehicle and a ramp rail according to claim 1 further comprising:
holes having a diameter of from about ¼ of an inch to about ½ of an inch displaced near the two free corners of the first plate.

10. The tail bridge for bridging a tail end of a motor vehicle and a ramp rail according to claim 1 further comprising:
holes having a diameter of from about ¼ inch to 1 inch disposed on the second plate and on the third plate, which are aligned in a vertical direction toward the second and third plate extension.

11. The tail bridge for bridging a tail end of a motor vehicle and a ramp rail according to claim 1 where the device is comprised throughout of an extruded metal.

12. The tail bridge for bridiging a tail end of a motor vehicle and a ramp rail according to claim 11 wherein the extruded metal is an aluminum alloy.

13. The tail bridge for bridging a tail end of a motor vehicle and a ramp rail according to claim 1 wherein the first plate has an extension of from about 4 to 6 inches and where the second plate and the third plate have an extension of from about 3 to 5 inches.

14. The tail bridge for bridging a tail end of a motor vehicle and a ramp rail according to claim 1 wherein the width of the plates is from about 5 to 15 inches and wherein the first plate has a thickness of from about 0.15 inches to 0.5 inches, wherein the second plate has a thickness of from about 0.2 to 0.4 inches, wherein the third plate has a thickness of from about 0.15 to 0.3 inches, wherein the intermediate section has a thickness of from about 0.2 to 0.4 inches and wherein fillets are provided between the first plate, the second plate and the intermediate plate and where the radius of the fillet is from about 0.5 to 1.5 the thickness of the intermediate section.

15. The tail bridge for bridging a tail end of a motor vehicle and a ramp rail according to claim 1 wherein the yield strength for 0.2 percent offset is at least 10,000 pounds per square inch, wherein the tensile strength of the alloy employed is at least 20,000 pounds per square inch and wherein the Brinell hardness of the alloy is at least 40.

16. The trail bridge for bridging a tail end of a motor vehicle and a ramp rail according to claim 1 wherein the rated stability of the device is at least 300 pounds maximum for each device.

17. A tail bridge for bridging a tail end of a motor vehicle and a ramp rail comprising:
a first plate to be placed on the tail end of the motor vehicle;
a second plate rigidly joined to the first plate and extending uninterruptedly at an edge of the first plate running substantially parallel to a tail edge of the motor vehicle tail end and forming an angle of from about 12 to 20 degrees relative to the first plate;
an intermediate section attached between the first and second plate and extending downwardly;
a third plate attached to the lower end of the intermediate section and running substantially parallel to the second plate and spaced therefrom by a distance corresponding to the width of a rail to be placed between the second and third plate.

* * * * *